UNITED STATES PATENT OFFICE.

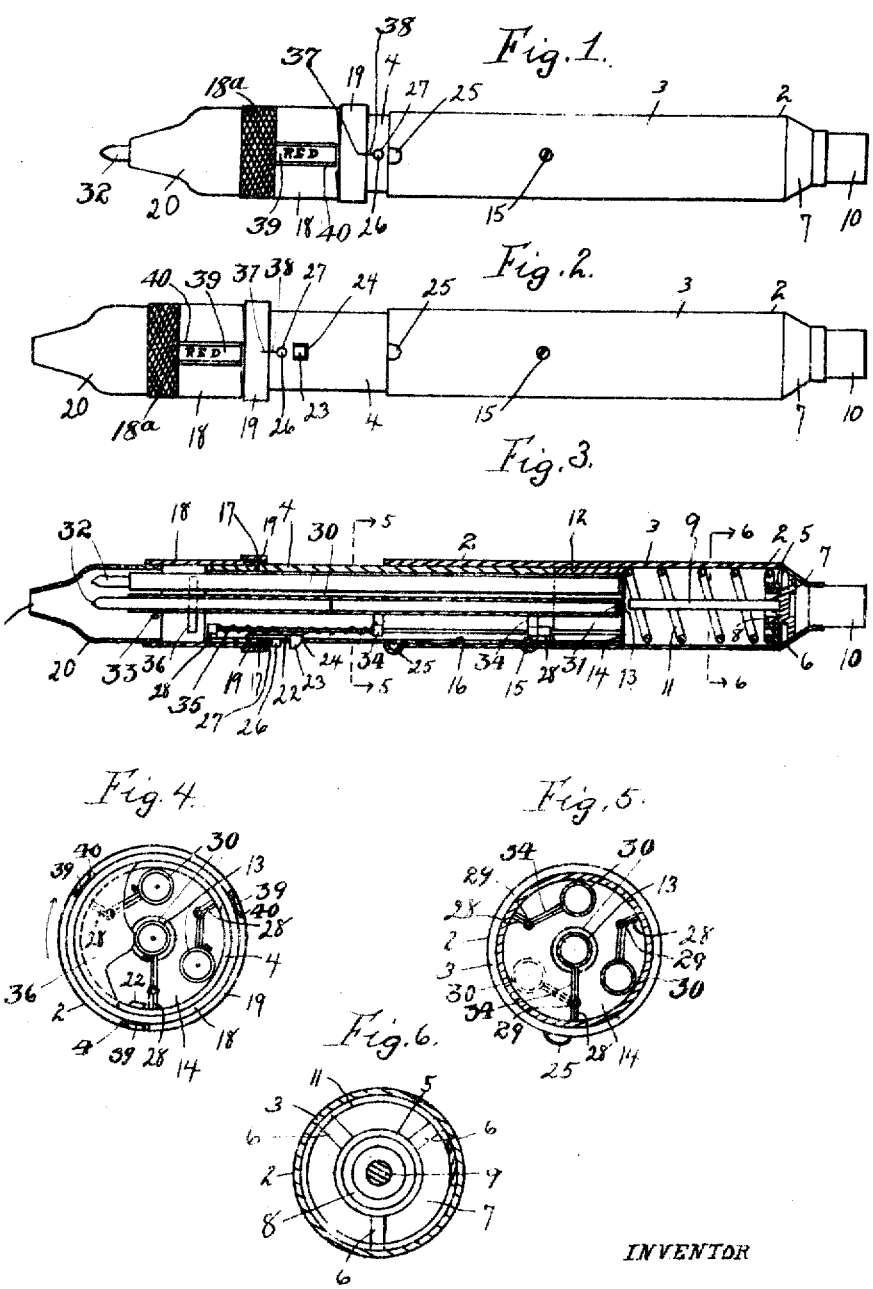

ROMOLO NARDI, OF CAMDEN, NEW JERSEY.

MAGAZINE-PENCIL.

1,304,590.  Specification of Letters Patent.  Patented May 27, 1919.

Application filed November 22, 1918. Serial No. 263,658.

*To all whom it may concern:*

Be it known that I, ROMOLO NARDI, a subject of the King of Italy, residing at Camden, in the county of Camden and State of New Jersey, have invented new and useful Improvements in Magazine-Pencils, of which the following is a specification.

My invention relates to new and useful improvements in magazine pencils, and has for its object to provide a plurality of marking elements or devices housed in a single casing provided with means whereby any one of said marking devices may be selected for use and having other means whereby the marking device selected and that one only will be projected beyond the end of the casing so that it may be used.

Another object of the invention is to provide a hinge within a suitable casing having an outlet at one end, a number of holders any one of which will move to the longitudinal center of the casing for projections toward the open end of said casing whereby a marking device carried by the projected holder will extend beyond the end of the casing so that the same may be used, each of said holders having connected therewith suitable means for returning them to their normal positions.

A further object of the invention is to provide in a device of the character above stated a telescoping casing one part thereof carrying a number of holders for marking devices and the other part carrying a centrally located push pin whereby the marking devices selected for use will be projected beyond the casing and to provide the parts of said casing with suitable locking means whereby they may be located in position when a marking device is to be used.

A still further object of the invention is, to provide suitable indication devices and holders for guide means whereby the desired marking device may be selected for projection from the end of the casing.

With these ends in view my invention consists in the details of construction and combination of elements hereinafter set forth and then specifically designated by the claims.

In order that those skilled in the art to which the invention appertains may understand how to make and use the same I will describe its construction in detail referring by numeral to the accompanying drawings forming a part of this application in which:—

Figure 1, is a side elevation of my improved magazine pencil showing it in the position for use with one of the marking devices or leads projecting from the end of the casing.

Fig. 2, is a similar view showing the casing extended to permit the selection of another of the marking devices.

Fig. 3, is a longitudinal sectional view thereof.

Fig. 4, is an enlarged end view thereof with the point cover or thimble removed.

Fig. 5, is an enlarged section at the line 5—5 of Fig. 3, and

Fig. 6, is an enlarged section at the line 6—6 of Fig. 3.

In carrying out my invention as here embodied 2 represents a telescopic casing or housing comprising an outer shell 3 and an inner shell 4. In the outer shell 3 is an interiorly threaded ring 5. Adjacent its outer end said ring is of less diameter than the shell 3 and is therefore mounted in place by suitable arms or projections 6 carried by the ring and attached to the inner face of the shell in any suitable or approved manner. On the outer end of this shell 3 is detachably mounted the cap 7 having an exteriorly threaded flange or projections 8 adapted to be secured into the ring 5 and said cap carries a centrally located push pin 9 extending some distance into the shell 3 and if found desirable said cap may carry an exterior eraser 10.

Within the shell 3 is a coiled spring 11 one end of which rests against the arms 6 as the stationary element while the other end of said spring engages a cup shaped follower 12 as the movable element said cup shaped follower being slidably mounted within the shell 3 and having a central opening 13 in its end wall 14.

The cup shaped follower 12 engages one end of the inner shell 4 which is also slidably mounted within the outer shell 3 and is limited in its telescopic movements by the screw 15 threaded in the outer shell 3 and the inner end of which projects into a longitudinal slot 16 in the shell 4. Said shell 4 has an outwardly projecting annular flange or rib 17 formed therefrom and adjacent its outer end against this rib rests one end of the revolving barrel 18 which is held in place by a fastening ring 19 large enough to fit over said rib, but having a flange engaging the face of said rib opposite the face engaged by the inner end of the barrel 18 said ring being attached to the barrel 18 in any suitable manner as by threads and to the outer end of this barrel is attached in any suitable and approved manner the point cover or thimble 20 having a reduced open end 21. The revolving barrel is knurled at 18ᵃ to facilitate revolving said barrel.

On the inside of the shell 4 is attached a spring latch 22 the nose 23 of which projects through an opening 24 in said shell and under certain conditions engages the keeper 25 formed by producing a boss at the inner end of the outer shell 3 said spring latch is actuated by a lug or projection 26 which is carried thereby and which projects through the hole 27 in the shell 4.

Within the shell 4 are a number of pairs of pintle holders or stationary hinge leaves 28 one number or leaf of each pair being preferably located at each end of the shell 4 as plainly shown in Fig. 3. These pintle holding members or hinge leaves are secured to the inner face of the shell 4 in any suitable and well known manner and are preferably arranged on radial lines as shown in Figs. 4 and 5. In each pair of co-acting stationary leaves 28 is fixed a pintle or rib 29 running the entire length of the shell 4 with their inner ends projecting beyond the inner end of the shell 4 so that the end wall of the follower 12 may rest against the ends of said pintles if desirable although if preferred the open end of the follower 12 may engage the inner end of the shell 4.

The reference numeral 30 represents a plurality of holders for leads, crayons or other suitable marking devices and these holders are tubular in form having open outer ends while the inner ends are closed by end walls 31 and in these holders are mounted the leads or marking devices 32 having portions projecting from the outer open ends, said marking devices being held in place by some suitable means such as for instance set screws 33 threaded through the holders with the ends of the screws impinging on the marking devices and said marking devices may be of different colors.

Each of these holders carries a pair of movable hinge members or leaves 34 one of said members being located approximately midway between the ends of the holders while the other is located adjacent the inner end of each holder or in other words the leaves or members carried by the holders are located so as to be between the stationary hinge leaves 28 spaced to permit of a certain longitudinal movement of the holders. The hinge leaves 34 are slidably and rotatably mounted upon the pintles 29 and are normally held within the outer shell 4 as shown in Fig. 3 and in contact with the inner surface of said shell as shown by two of the holders in Figs. 4 and 5 by means of springs 35 one of which is coiled about each pintle with one end fixed to one of the stationary hinge leaves 28 and one of the movable hinge leaves 34 of each set so that by the compression of said springs the holders are held inwardly relative to the casing, while by the torsion said holders are forced toward and normally held in contact with the shell 4.

In order to select one of the marking devices for use or to move the desired holder to the longitudinal center of the casing so that the marking device may be projected through the open end 21 I provide a cam 36 which is secured to the inner surface of the rotatable barrel 18 the high point of which is so located that when in contact with one of the holders said holder will be held in the longitudinal center of the casing as shown in Figs. 4 and 5, in which position the centered holder will be in alinement with the open end 21 of the thimble or point cover 20. The bearing surfaces of this cam are such that during the rotation of the barrel 18 in the proper direction or in the direction of the arrow shown in Fig. 4 a holder will be gradually rotated about its pintle until said holder is moved to the longitudinal center of the casing from which point the cam surface drops abruptly toward the walls of the casing so that after the high point of the cam has passed the holder the latter will immediately be moved toward the walls of the casing so as to be out of the way of the succeeding holder.

In order that the user of this pencil may know when the different holders are in the longitudinal center of the casing or when the cam is in a position to hold one of said holders in the longitudinal center as shown in Figs. 4 and 5 I provide a number of indication marks 37, one for each of the holders 30, on the rotatable barrel or some part associated therewith such as the holding or retaining ring 19 and these indication marks are so located that when one of them is directly opposite a similar indication mark 38 on the shell 4, or when one of said indication marks 37 is opposite the spring latch 22 then the cam 36 is in a position to maintain one of the holders in the central position. In order to indicate which holder is in the central position index or guide cards 39 may be provided, one for each of the holders, and this may be secured or attached to the rotatable barrel in any suitable manner and I have here shown such index cards as being slidably mounted or removably arranged in suitable holders 40 carried by the rotatable barrel and said holders are in the form of relatively thin sheets of metal with two opposite edges bent inward to form flanges which are spaced from the main body or the back wall of the metal which construction is plainly shown in Fig. 4.

Where the marking devices 32 are of different colors as for instance red, black and green the index cards are so marked thus enabling the user of the pencil to readily select the desired marking device.

Considering that the pencil is extended as shown in Figs. 2 and 3 then by rotating the barrel 18 until the desired indication marked 37 is brought into alinement with the indication mark 38 or the post 26 of the spring latch 22 at which time the holder carrying the desired marking devices has been moved and is maintained in the longitudinal center of the pencil casing against the torsional effect of the spring 35. When the desired holder has been brought about this central position the shell 4 is forced into the shell 3 against the action of the spring 11 causing the push pin 9 to pass through the opening 13 in the end wall of the follower 12 and engage the closed inner end of the centered holder thereby forcing said holder outward against the compression of the spring 35 until the marking device carried by said holder is projected through the open end 21 of the thimble 20. This movement of the two shells will bring the nose 23 of the spring latch 22 into engagement with the keeper 25 thereby holding the two shells in their collapsible positions as shown in Fig. 1 so that the pencil may be used.

When the pencil is not to be used the spring latch is disengaged from its keeper and the action of the spring 11 will force the two shells 3 and 4 in opposite directions so as to extend the pencil as shown in Fig. 3. As soon as this movement takes place or during the action of this movement so that the push pin 9 is withdrawn from the shell 4 and the follower 12 the compression of the spring 35 will return the holder to its normal position shown in Fig. 3.

If desired the pencil may be left in this position when not in use or the rotatable barrel 18 may be rotated a sufficient distance to move the high point of the cam 36 between two of the holders so that none of said holders will be in the central position at which time the two shells may be collapsed, one within the other and the parts locked in the positions shown in Fig. 1 without one of the marking devices protruding from the casing.

Should the user desire to utilize another marking device such as a differently colored one, the parts are brought to the positions shown in Fig. 3 and then the barrel 18 is rotated causing each holder to be moved to the central position by the cam in progressive order until the desired one is moved to the central position. As the cam passes the different holders they will be forced away from the central position by the torsional effect of their respective springs 35.

Of course I do not wish to be limited to the exact details of construction as herein shown as these may be varied within the limits of the appended claims without departing from the spirit of my invention.

Having thus fully described my invention what I claim as new and useful is:—

1. A pencil comprising a casing of two collapsible sections or shells, a plurality of holders hinged within one of said shells and capable of being moved to the longitudinal center thereof, means connected with one of said shells for moving any one of the holders, to the center position and means carried by the other shell for engaging the center holder to move the latter longitudinally when the two shells are moved toward each other or contracted.

2. In a device of the character stated two telescoping shells, means for limiting the movements of said shells relative to each other, means for holding said shells in contracted positions, a follower within one of said shells and engaging the other shell, means interposed between the follower and a portion of one of the shells for forcing the two shells apart or in opposite directions, a plurality of holders hinged within one of said shells and capable of a rotary and longitudinal movement, means for forcing said holders into their shell and away from the longitudinal center, a rotatable barrel carrying a cam for progressively moving said holders to the longitudinal center of the shells a thimble having a reduced open end and carried by said barrel a push pin carried by one of said shells, adapted to engage the center holder when said shells are collapsed for imparting a longitudinal movement to said holder.

3. A magazine pencil comprising in combination an outer shell, an internally threaded ring, means for mounting said ring within the outer shell at one end thereof, a cap having a threaded portion for engagement with said ring, a push pin carried by said cap and projecting into the outer shell, a latch keeper at the opposite end of said shell, an inner shell, having a longitudinal slot, slidably mounted in the outer shell, a screw attached to the outer shell and registering with said slot for limiting the movements of said shells, a spring latch carried by the inner shell adapted to engage the keeper of the outer shell when the two shells are collapsed, an annular outwardly projecting flange or rib carried by the inner shell adjacent its outer end, a rotatable barrel mounted on the outer end of the inner shell with its inner end in engagement with the flange or rib, a holding or retaining ring mounted on the inner shell and attached to the barrel, said ring having an inturned flange for engagement with the aforesaid flange or rib, indication marks on said ring, index card holders carried by the barrel adapted to hold index cards, a cam carried by the rotatable barrel projecting from the inner face thereof, a thimble having an open reduced end carried by the barrel, a follower having an end wall with a hole therein, slidably mounted within the outer shell and engaging the inner end of the inner shell, a spring located between the follower and the means for mounting the threaded ring in place so that said follower and the inner shell are normally forced outward and a plurality of rotatable and slidable holders adapted to be moved to the longitudinal center of the shells by the cam when the barrel is rotated so that they may be moved longitudinally by the push pin when the two shells are collapsed for the purpose described.

4. A magazine pencil comprising two telescoping shells, stationary hinge leaves carried by the inner shell within the same, said leaves being arranged in pairs and located about different points of the inner shell, a plurality of pintles, one of which is fixed in each pair of stationary hinge leaves, a plurality of holders adapted to carry suitable marking devices, hinge leaves carried by said holders slidably and rotatably mounted on the pintles, a spring coiled about each pintle and connected with one of the stationary hinge leaves and one of the hinge leaves of each holder for normally forcing the holders inward by compression and normally rotating them toward the wall of the inner shell by torsion, a rotatable barrel carried by the inner shell, a cam projecting therefrom and adapted to successively engage the holders to move the latter to the longitudinal center of the shells and a push pin carried by the outer shell for engaging the centered holder to move the same outward.

In testimony whereof, I have hereunto affixed my signature.

ROMOLO NARDI.